United States Patent
Major et al.

(10) Patent No.: US 9,346,338 B2
(45) Date of Patent: May 24, 2016

(54) LOW REFRIGERANT CHARGE SECONDARY LOOP AIR CONDITIONING SYSTEM

(75) Inventors: Gregory A. Major, Farmington Hills, MI (US); William R. Hill, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2562 days.

(21) Appl. No.: 12/032,816

(22) Filed: Feb. 18, 2008

(65) Prior Publication Data
US 2009/0205359 A1 Aug. 20, 2009

(51) Int. Cl.
- *B60H 1/32* (2006.01)
- *F25B 39/04* (2006.01)
- *F25B 17/02* (2006.01)
- *B60H 1/00* (2006.01)

(52) U.S. Cl.
CPC .......... *B60H 1/00885* (2013.01); *B60H 1/3229* (2013.01); *B60H 2001/00928* (2013.01)

(58) Field of Classification Search
USPC ........................................... 62/239, 509, 478
See application file for complete search history.

(56) References Cited

U.S. PATENT DOCUMENTS

| | | | |
|---|---|---|---|
| 6,260,379 B1 * | 7/2001 | Manwill | B60H 1/3227 62/474 |
| 7,007,493 B2 | 3/2006 | Kadle et al. | |
| 7,063,137 B2 | 6/2006 | Kadle et al. | |
| 2007/0084596 A1 * | 4/2007 | Umehara | B60H 1/3219 165/202 |
| 2007/0144715 A1 * | 6/2007 | Ohashi | F25B 39/022 165/153 |
| 2008/0149312 A1 * | 6/2008 | Shembekar | F25B 39/04 165/132 |

FOREIGN PATENT DOCUMENTS

| | | |
|---|---|---|
| DE | 10012197 A1 | 9/2001 |
| DE | 60101082 T2 | 5/2004 |
| DE | 10346141 A1 | 5/2005 |
| EP | 1441274 A2 | 7/2004 |
| FR | 2889504 | 2/2007 |
| JP | 2002277106 | 9/2002 |
| JP | 2006007866 | 1/2006 |

* cited by examiner

*Primary Examiner* — Frantz Jules
*Assistant Examiner* — Steve Tanenbaum

(57) ABSTRACT

A secondary loop air conditioning system for a vehicle that includes a condenser and an integrated assembly is disclosed. The condenser has a first condenser header spaced from a second condenser header, a condenser core extending between the first and second condenser headers, and a refrigerant inlet operatively engaging the first condenser header. The integrated assembly includes a chiller mounted to the first condenser header and having a liquid inlet and a liquid outlet configured to be in fluid communication with a secondary loop of the air conditioning system, and an expansion device in fluid communication with the condenser and mounted adjacent to the chiller for directing refrigerant into the chiller, and a refrigerant outlet. Also, a receiver/dryer area may be located in one of the condenser and the integrated assembly.

20 Claims, 3 Drawing Sheets

LOW REFRIGERANT CHARGE SECONDARY LOOP AIR CONDITIONING SYSTEM

BACKGROUND OF INVENTION

The present invention relates generally to air conditioning systems for vehicles, and more particularly to secondary loop air conditioning systems.

In a typical secondary loop air conditioning system for a vehicle, a primary loop may include an engine driven compressor mounted for coupling to a front end accessory drive, a condenser mounted in a condenser, radiator, fan module (CRFM), an accumulator and expansion valve mounted separate from the compressor and condenser, and a refrigerant-to-liquid chiller mounted separately from the other components. The typical secondary loop air conditioning system may also include a secondary loop having a liquid-to-air heat exchanger mounted in a heating, ventilation and air conditioning (HVAC) module, a liquid reservoir and a pump for pumping the liquid through the chiller, heat exchanger and reservoir. While these secondary loop systems provide for some additional flexibility in configuring and operating the air conditioning system, they also add extra components and add additional packaging concerns when locating the components in the vehicle. Moreover, they may still require nearly as much refrigerant in the primary loop as conventional single loop refrigerant systems.

SUMMARY OF INVENTION

An embodiment contemplates an air conditioning system for a vehicle that may comprise a condenser and an integrated assembly. The condenser may have a first condenser header spaced from a second condenser header, a condenser core extending between the first and second condenser headers, and a refrigerant inlet operatively engaging the first condenser header. The integrated assembly may include a chiller mounted to the first condenser header and having a liquid inlet and a liquid outlet configured to be in fluid communication with a secondary loop of the air conditioning system, an expansion device in fluid communication with the condenser and mounted adjacent to the chiller for directing refrigerant into the chiller, and a refrigerant outlet. Also, a receiver/dryer area may be located in one of the condenser and the integrated assembly.

An embodiment contemplates an air conditioning system for a vehicle. The air conditioning system may include a refrigerant compressor, a condenser having a first condenser header spaced from a second condenser header, a condenser core extending between the first and second condenser headers, and a refrigerant inlet operatively engaging the first condenser header. The air conditioning system may also include an integrated assembly including a chiller mounted to the first condenser header and having a liquid inlet and a liquid outlet, an expansion device in fluid communication with the condenser and mounted adjacent to the chiller for directing refrigerant into the chiller, and a refrigerant outlet; a pump in fluid communication with the liquid outlet; and a cooler in fluid communication with the pump and the liquid inlet.

An embodiment contemplates an air conditioning system for a vehicle comprising a primary refrigerant loop and a secondary liquid loop. The primary refrigerant loop may include a refrigerant compressor; a condenser having a first condenser header spaced from a second condenser header, a condenser core extending between the first and second condenser headers, and a refrigerant inlet operatively engaging the first condenser header; an integrated assembly including a chiller mounted to the first condenser header, an expansion device in fluid communication with the condenser and mounted adjacent to the chiller for directing a refrigerant into the chiller, and a refrigerant outlet; and a sub-cool core located between the second condenser header and the integrated assembly and configured to direct the refrigerant from the second condenser header directly into the integrated assembly. The secondary liquid loop may include the chiller having a liquid inlet and a liquid outlet; a pump in fluid communication with the liquid outlet; and a cooler in fluid communication with the pump and the liquid inlet.

An advantage of an embodiment is that, by locating an integrated expansion device, chiller and receiver/dryer on a condenser header, a compact arrangement of components is created that allows for easier packaging in the vehicle. The number of lines extending between components is reduced. Also, a suction line length can be minimized by integrating the chiller on the same end of the condenser as the compressor is located. The compact arrangement of components for the refrigerant loop, then, allows for a minimal amount of refrigerant to be used in the overall air conditioning system. Moreover, the refrigerant does not enter the passenger compartment. Accordingly, some refrigerants that otherwise might not be suitable for use in a vehicle air conditioning system, such as flammable or mildly toxic refrigerants, may be used.

An advantage of an embodiment is that multiple cooling point air conditioning systems can be provided with a negligible increase in refrigerant charge versus a single point system. Only one chiller is used versus multiple evaporators for a conventional air conditioning system. This eliminates potential oil trapping issues that may arise with multiple cooling point (double evaporator) systems when a rear unit is turned off.

An advantage of an embodiment is that the expansion device mounted in the engine compartment with the integrated assembly, so the flow noise from this device is eliminated from the passenger compartment. Moreover, compressor working noise is greatly reduced or eliminated from the passenger compartment since the refrigerant lines do not enter the passenger compartment either.

DETAILED DESCRIPTION

Figure 1:
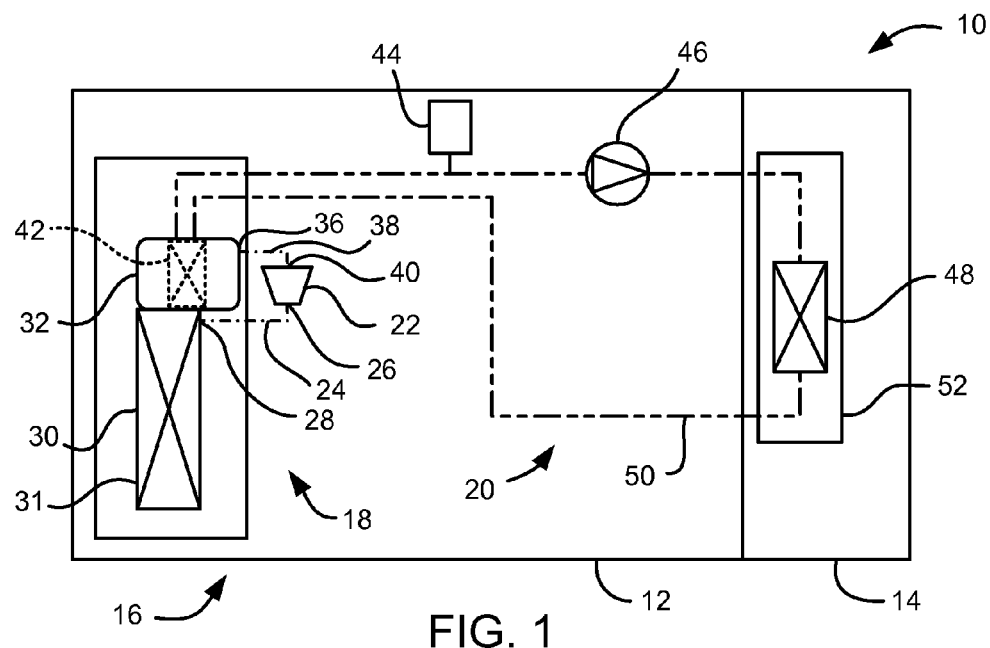
FIG. 1 is a schematic illustration of a vehicle air conditioning system.

Referring to FIG. 1, a vehicle, indicated generally at 10, is shown. The vehicle 10 includes an engine compartment 12 and a passenger compartment 14, with an air conditioning system 16 mounted in portions of the compartments 12, 14. The air conditioning system 16 has a primary (refrigerant) loop 18 and a secondary (liquid) loop 20.

The primary loop 18 includes a compressor 22 and a refrigerant line 24 leading from a compressor output 26 to a refrigerant inlet 28 of a condenser 30. The refrigerant lines in FIG. 1 are illustrated as dash-dot-dash lines. The condenser 30 may be part of a condenser, radiator, fan module (CRFM) 31. The primary loop 18 also includes an integrated expansion device, chiller, receiver/dryer assembly 32 that is mounted to the condenser 30. The integrated assembly 32 has a refrigerant outlet 36 connected to a suction line 38 leading to an inlet 40 to the compressor 22, thereby completing the primary loop 18. Preferably, the integrated assembly 32 is mounted on the same end of the condenser 30 as the compressor 22 is located in order to minimize the length of the suction line 38. The refrigerant contained in the primary loop 18 does not enter the passenger compartment 14, and, given the compact arrangement of the components, the loop 18 is relatively small. Thus, types of refrigerants that might not otherwise be desirable for use in a passenger vehicle may be employed.

The secondary loop 20 includes a chiller 42 of the integrated assembly 32, an expansion tank 44, a pump 46, a cooler 48, and liquid lines 50 extending between these components. The liquid lines 50 are shown in FIG. 1 as phantom lines to distinguish them from the refrigerant lines. The cooler 48 may be mounted in a HVAC module 52 in the passenger compartment 14. The liquid in the secondary loop 20 may be, for example, a mix of water and ethylene glycol. Although, the liquid that flows through the secondary loop 20 may be comprised of other types of suitable liquids with desirable thermal transfer properties, if so desired.

Figure 2:
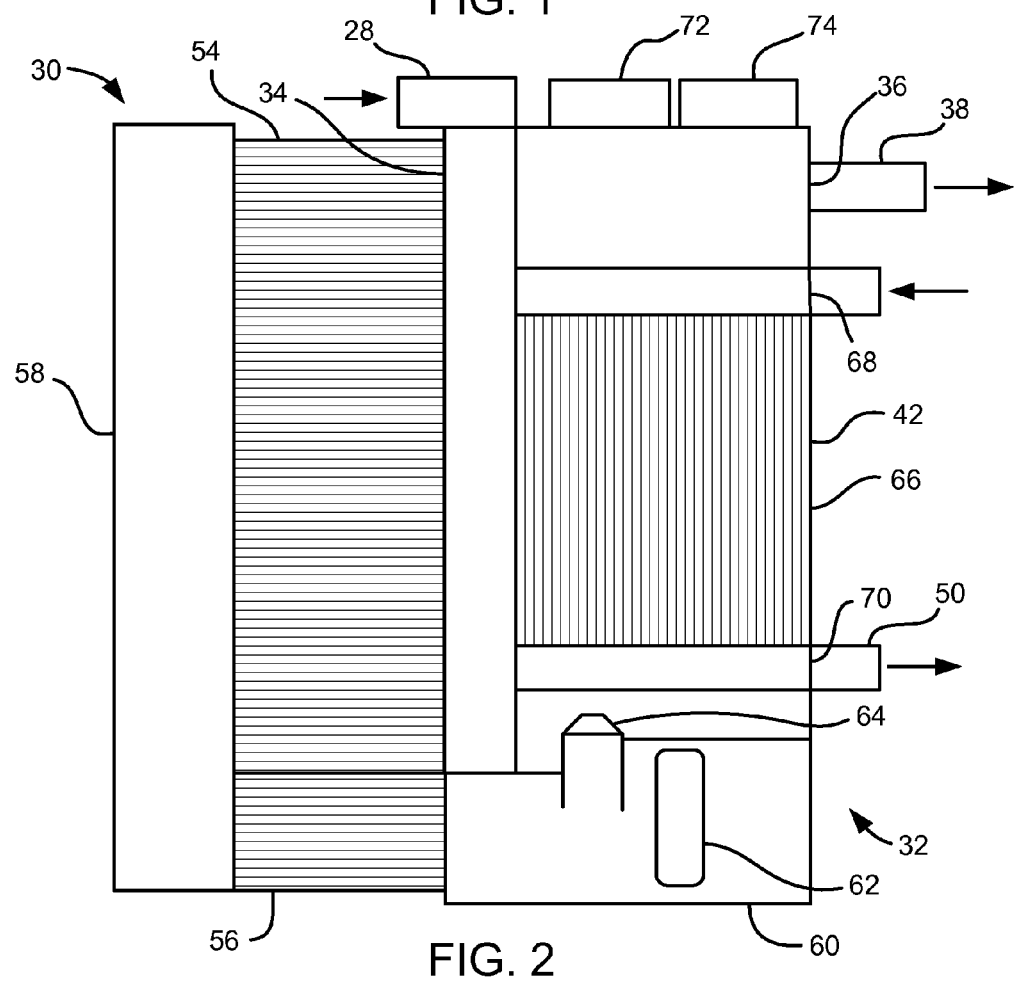
FIG. 2 is a schematic illustration of an integrated expansion device, chiller and receiver/dryer assembly mounted to a condenser.

FIG. 2 illustrates the integrated expansion device, chiller, receiver/dryer assembly 32 and condenser 30 of FIG. 1 in more detail. The condenser 30 includes a first condenser header 34 upon which the refrigerant inlet 28 is located. The integrated assembly 32 is mounted to the first condenser header 34. The condenser 30 also includes a condenser core 54 located above a sub-cool core 56, which both extend to a second condenser header 58. The sub-cool core 56 opens to a receiver/dryer area 60 in the integrated assembly 32.

The receiver/dryer area 60 includes a desiccant 62 located therein, and opens to an expansion device 64—which may be, for example, and orifice tube. The orifice device 64 directs the refrigerant into a chiller core 66 of the chiller 42. Located opposite the chiller core 66 from the expansion device 64 is the refrigerant outlet 36 leading to the suction line 38. A liquid inlet 68 to, and a liquid outlet 70 from the chiller 42 connect to the liquid lines 50 in the secondary loop. The integrated assembly 32 also includes a charge port 72 and a suction pressure sensor 74 mounted on top. One will note that most components of the refrigerant loop are integrated and packaged into a relatively small area.

The operation of the air conditioning system 16 will now be discussed relative to FIGS. 1 and 2. The unnumbered arrows in FIGS. 2-5 represent the direction of flow of refrigerant and liquid into and out of the integrated assembly 32. The compressor 22 and the pump 46 are driven, causing the refrigerant and the liquid to flow through the primary loop 18 and the secondary loop 20, respectively.

In the primary loop 18, after the refrigerant is compressed in the compressor 22, the refrigerant flows through the refrigerant line 24 to the refrigerant inlet 28 on the first condenser header 34. The refrigerant flows through the condenser core 54, the second condenser header 58, and the sub-cool core 56. As with a conventional condenser, heat is transferred from the refrigerant to air flowing through the condenser 30. From the sub-cool core 56, the refrigerant flows into the receiver/dryer area 60 containing the desiccant 62, where moisture is removed from the refrigerant. The refrigerant then flows through the expansion device 64, dropping the temperature of the refrigerant, before flowing through the chiller 42. The refrigerant then flows through the refrigerant outlet 36 and the suction line 38 and back to the compressor 22.

In the secondary loop 20, the liquid flows through the liquid inlet 68 and through the chiller core 66, where heat is transferred to the refrigerant. The liquid then flows through the liquid outlet 70 and through one of the liquid lines 50 to the pump 46. As the liquid flows past the expansion tank 44, liquid may be removed from or added to the secondary loop 20. The pump 46 pumps the liquid through another liquid line 50 to the cooler 48, where it absorbs heat from air flowing through the HVAC module 52. The liquid then flows back to the chiller inlet 68.

Figure 3:
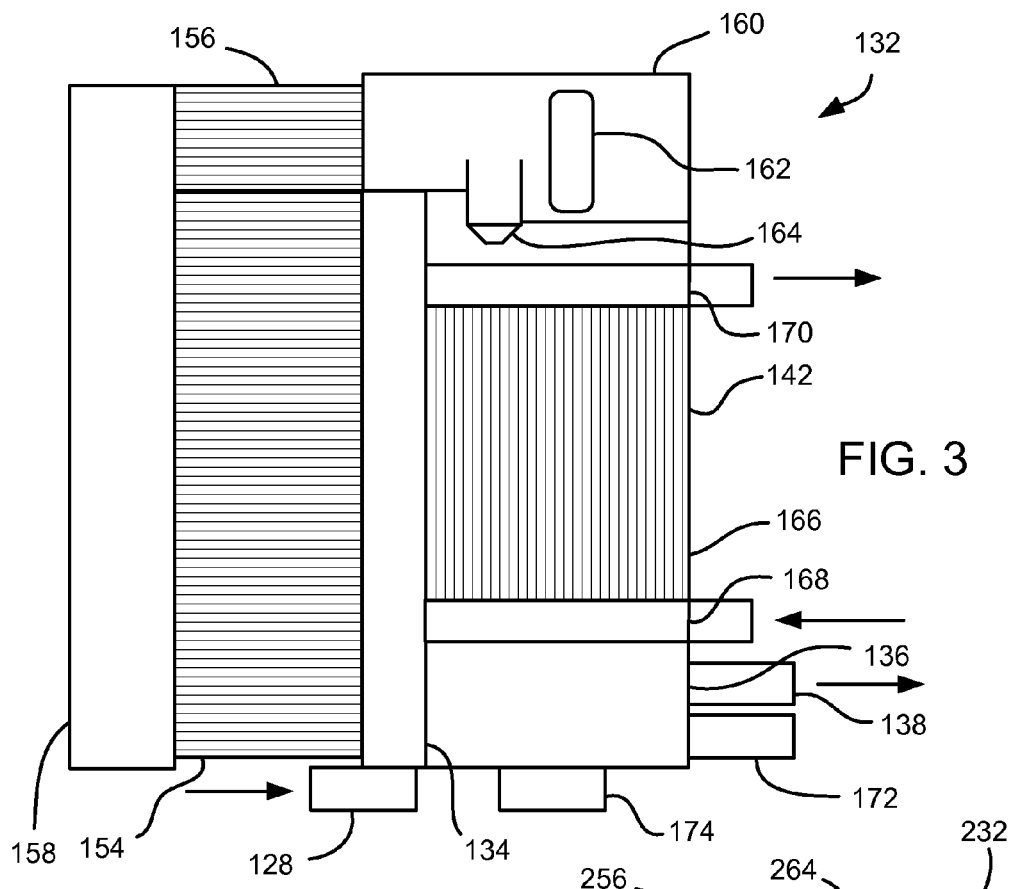
FIG. 3 schematic illustration similar to FIG. 2, but illustrating a second embodiment.

FIG. 3 illustrates a second embodiment. Since this embodiment is similar to the first, similar element numbers will be used for similar elements, but employing 100-series numbers. FIG. 3 shows an alternate embodiment of the integrated expansion device, chiller, receiver/dryer assembly 32 and condenser 30 shown in FIG. 2.

The integrated assembly 132 is still mounted to the first condenser header 134, but the refrigerant inlet 128 is located on the bottom of the first condenser header 134 while the sub-cool core 156 is located on top of the condenser core 154. The second condenser header 158 is still on the opposite side of the condenser core 154 from the integrated assembly 132. The receiver/dryer area 160 and desiccant 162 are still adjacent to and receive refrigerant from the sub-cool core 156, but now are located above the chiller 142. The expansion device 164 directs the refrigerant downward from the receiver/dryer area 160 to the chiller core 166. The refrigerant outlet 136 (connecting to the suction line 138) is located below the chiller core 166. The charge port 172 and the suction pressure sensor 174 are now located near the bottom of the integrated assembly 132. Also, the liquid inlet 168 is now located below the liquid outlet 170. The operation of the air conditioning system 116 is essentially the same as in the first embodiment and so will not be discussed further.

Figure 4:
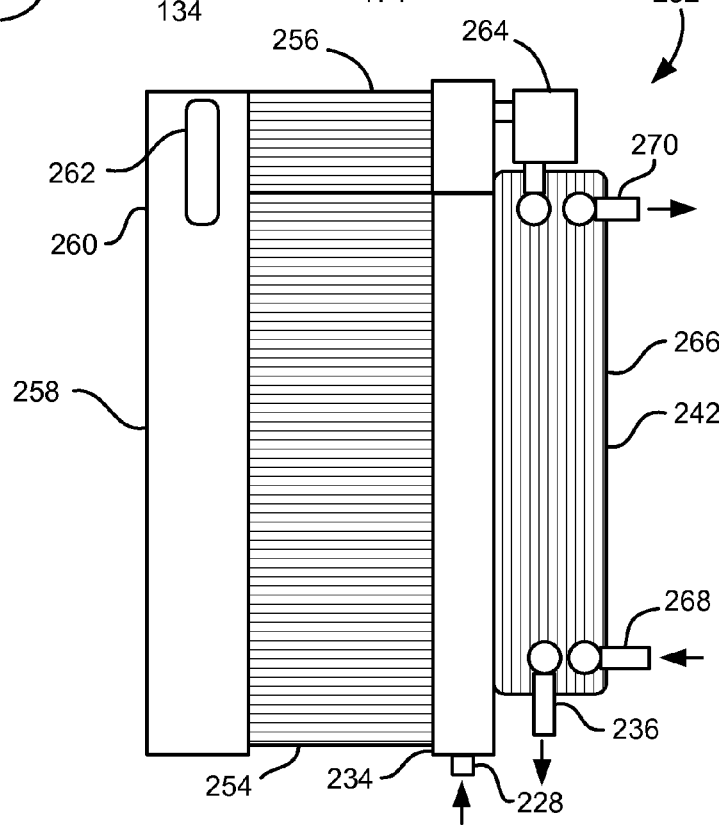
FIG. 4 is a schematic illustration similar to FIG. 2, but illustrating a third embodiment.

FIG. 4 illustrates a third embodiment. Since this embodiment is similar to the first, similar element numbers will be used for similar elements, but employing 200-series numbers. FIG. 4 shows another alternate embodiment of the integrated expansion device, chiller, receiver/dryer assembly 32 and condenser 30 shown in FIG. 2.

The integrated assembly 232 is still mounted to the first condenser header 234, but the refrigerant inlet 228 is now located on the bottom of the first condenser header 234 while the sub-cool core 256 is located on top of the condenser core 254. The second condenser header 258 is still on the opposite side of the condenser core 254 from the integrated assembly 232, but the receiver/dryer area 260 and the desiccant 262 are located in the second condenser header 258. The expansion device 264 is mounted on top of the chiller 242 and directs refrigerant downward into the chiller core 266. The chiller 242 is a plate type of heat exchanger, with the refrigerant outlet 236 extending from the bottom of the chiller 242. The liquid inlet 268 is located adjacent to the refrigerant outlet 236, and the liquid outlet 270 is located above the liquid inlet 268.

Figure 5:
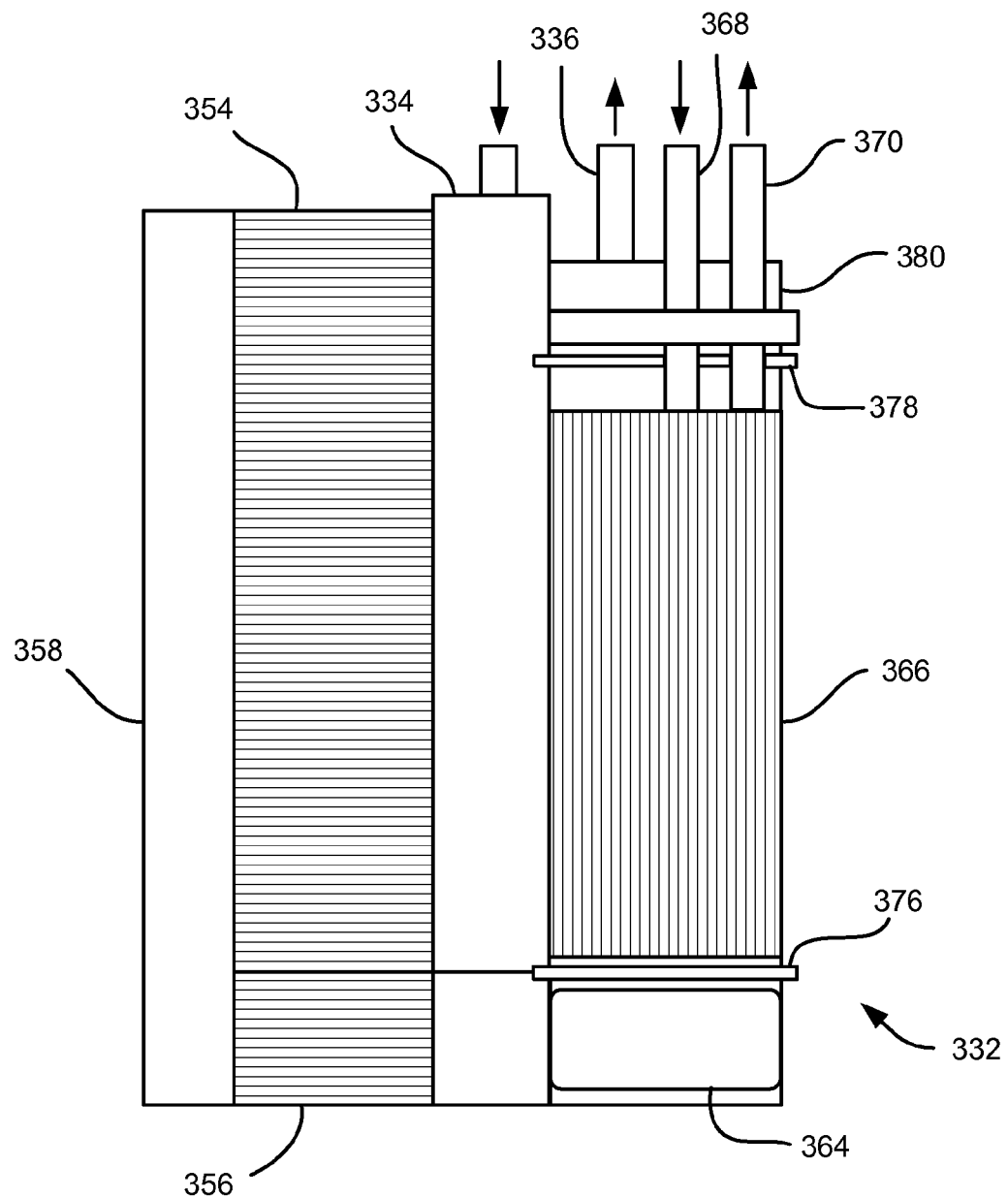
FIG. 5 is a schematic illustration similar to FIG. 2, but illustrating a fourth embodiment.

FIG. 5 illustrates a fourth embodiment. Since this embodiment is similar to the first, similar element numbers will be used for similar elements, but employing 300-series numbers. FIG. 5 shows an alternate embodiment of the integrated expansion device, chiller, receiver/dryer assembly 32 and condenser 30 shown in FIG. 2.

The integrated assembly 332 is again mounted to the first condenser header 334, with a condenser core 354 and sub-cool core 356 mounted between the first condenser header 334 and the second condenser header 358. An expansion device 364 is mounted adjacent to and receives refrigerant from the sub-cool core 356. An oil ring 376 is located between the expansion device 364 and the chiller core 366. The chiller core 366 may be a vertical extrusion. Another oil ring 378 is located above the chiller core 366, with a snap retainer 380 above the oil ring 378. The refrigerant outlet 336 extends upward above the snap retainer 380. Also, the liquid inlet 368 and liquid outlet 370 extend upward above the snap retainer 380.

While certain embodiments of the present invention have been described in detail, those familiar with the art to which this invention relates will recognize various alternative designs and embodiments for practicing the invention as defined by the following claims.

What is claimed is:

1. An air conditioning system for a vehicle comprising:
a condenser having a first condenser header spaced from a second condenser header, a condenser core extending between the first and second condenser headers, and a refrigerant inlet operatively engaging the first condenser header;
an integrated assembly including a chiller mounted to the first condenser header and having a liquid inlet and a liquid outlet configured to be in fluid communication with a secondary loop of the air conditioning system, an expansion device in fluid communication with the condenser and mounted adjacent to the chiller for directing a refrigerant into the chiller, and a refrigerant outlet; and
a receiver/dryer area located in one of the condenser and the integrated assembly.

2. The air conditioning system of claim 1 wherein the condenser includes a sub-cool core located between the second condenser header and the integrated assembly.

3. The air conditioning system of claim 2 wherein the receiver/dryer area is in the integrated assembly adjacent to the sub-cool core, and the expansion device is below the chiller and above the receiver/dryer area.

4. The air conditioning system of claim 2 wherein the receiver/dryer area is in the integrated assembly adjacent to the sub-cool core, and the expansion device is above the chiller and below the receiver/dryer area.

5. The air conditioning system of claim 2 wherein the receiver/dryer area is in the second condenser header.

6. The air conditioning system of claim 1 wherein the chiller includes a chiller core that is a plate type heat exchanger.

7. The air conditioning system of claim 1 wherein the chiller includes a chiller core that is a vertical extrusion.

8. The air conditioning system of claim 1 including a first oil ring located between the expansion device and the chiller and a second oil ring located between the chiller and the refrigerant outlet.

9. The air conditioning system of claim 1 wherein the integrated assembly includes a suction pressure sensor for detecting a refrigerant pressure for the refrigerant exiting the chiller.

10. An air conditioning system for a vehicle comprising:
a refrigerant compressor;
a condenser having a first condenser header spaced from a second condenser header, a condenser core extending between the first and second condenser headers, and a refrigerant inlet operatively engaging the first condenser header;
an integrated assembly including a chiller mounted to the first condenser header and having a liquid inlet and a liquid outlet, an expansion device in fluid communication with the condenser and mounted adjacent to the chiller for directing a refrigerant into the chiller, and a refrigerant outlet;
a pump in fluid communication with the liquid outlet; and
a cooler in fluid communication with the pump and the liquid inlet.

11. The air conditioning system of claim 10 wherein the refrigerant compressor is located adjacent to the first condenser header.

12. The air conditioning system of claim 10 wherein the condenser includes a sub-cool core located between the second condenser header and the integrated assembly.

13. The air conditioning system of claim 10 including a refrigerant line extending between an outlet of the refrigerant compressor and the refrigerant inlet.

14. The air conditioning system of claim 10 including a receiver/dryer area located in the second condenser header.

15. The air conditioning system of claim 10 including a receiver/dryer area located in the integrated assembly, and wherein the expansion device is below the chiller and above the receiver/dryer area.

16. The air conditioning system of claim 10 including a receiver/dryer area located in the integrated assembly, and wherein the expansion device is above the chiller and below the receiver/dryer area.

17. An air conditioning system for a vehicle comprising:
a primary refrigerant loop including a refrigerant compressor; a condenser having a first condenser header spaced from a second condenser header, a condenser core extending between the first and second condenser headers, and a refrigerant inlet operatively engaging the first condenser header; an integrated assembly including a chiller mounted to the first condenser header, an expansion device in fluid communication with the condenser and mounted adjacent to the chiller for directing a refrigerant into the chiller, and a refrigerant outlet; and a sub-cool core located between the second condenser header and the integrated assembly and configured to direct the refrigerant from the second condenser header directly into the integrated assembly; and
a secondary liquid loop including the chiller having a liquid inlet and a liquid outlet; a pump in fluid communication with the liquid outlet; and a cooler in fluid communication with the pump and the liquid inlet.

18. The air conditioning system of claim 17 including a first oil ring located between the expansion device and the chiller and a second oil ring located between the chiller and the refrigerant outlet.

19. The air conditioning system of claim 17 wherein the refrigerant compressor is located adjacent to the first condenser header.

20. The air conditioning system of claim 17 including a receiver/dryer area located in one of the condenser and the integrated assembly.

* * * * *